Feb. 15, 1966

E. S. GILCHRIST 3,235,856

GUARD CIRCUIT FOR TRANSMISSION LINES

Filed Sept. 26, 1962

United States Patent Office 3,235,856
Patented Feb. 15, 1966

3,235,856

GUARD CIRCUIT FOR TRANSMISSION LINES

Edgar Sheppard Gilchrist, Fairfield, Conn., assignor to Robertshaw Controls Company, Richmond, Va., a corporation of Delaware Filed Sept. 26, 1962, Ser. No. 226,305
6 Claims. (Cl. 340—187)

This invention relates to the transmission of information from one location to another, and, in particular, to the guarding of the transmission lines from leakage.

As the techniques of automation improve, more and more operations are being performed either automatically under the control of suitably programmed equipment, or semi-automatically under the control of one or two persons. In either case, the location at which the operation is being performed is usually remote from the location of the control, whether it be human or not. This necessitates the transmission of information which indicates the condition of the machine performing the operation to the control point where either the automated equipment or the person controlling the operation may respond to the information so transmitted.

Because the control point is often a substantial distance from the point at which the operation is being performed, it is desirable to keep the cost of installation to a minimum by providing a minimum of transmission lines. In an ungrounded system, this minimum is two wires per line. However, simple two wire transmission lines are subject to many adverse effects produced by external conditions, which effects often modify the information being transmitted. Since most information in such system is of the analog type where information is presented by the amplitude of some dimension such as voltage, current, phase, or the like, changes in external conditions such as changes in humidity, for example, may cause changes in leakage currents sufficient to substantially modify the calibration of the system and reduce the degree of accuracy. Most means of correcting this situation are expensive and often include shielding of the transmission line or by other, similarly complex and expensive means.

It is an object of this invention to provide a new and improved means for guarding transmission lines against being adversely affected by outside conditions.

It is another object of this invention to provide a new and improved transmission system for indicating and control circuits.

It is a further object of this invention to provide a new and improved means for reducing the effect of changes in ambient conditions from affecting two-wire transmissions.

Other objects and advantages of this invention will become apparent as the following description proceeds, which description should be considered together with the accompanying drawings in which.

Figure 1:
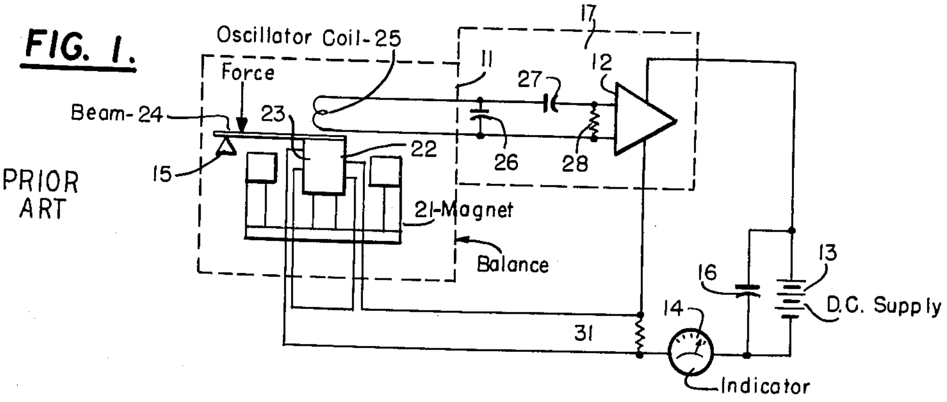
FIG. 1. PRIOR ART
FIG. 1 is a schematic diagram of a typical information sensing and transmission system.

Referring now to the drawings in detail, and to FIG. 1 in particular, the instrument illustrated comprises a detector shown generally in the block designated 11, an oscillator-amplifier 12, a source of electrical energy 13 and a meter or other indicator 14. The detector shown is a sensitive magnetic balance used to measure or indicate minute forces and comprises a permanent magnet core 21 about which two coils 22 and 23 are movably supported by a beam 24 which is pivoted at one end on a fulcrum 15 and has its other end supported in the magnetic path of the magnet 21. The beam 24 is usually connected to a device such as a Bourdon tube, for example, whose force is to be measured. Closely adjacent the magnet 21 and the beam 24 is a portion of a tuned circuit of the oscillator-amplifier 12. As shown in FIG. 1, the coil 25, which is tuned by the capacitor 26 and is connected to the oscillator-amplifier 12 through a normal decoupling capacitor 27 and across a resistor 28, is mounted within the magnetic field of the detector 11. The source of electrical energy is shown here as a battery 13 which supplies current for the oscillator-amplifier 12 and is shunted by a capacitor 16, but any suitable direct current power supply may be used. A feedback resistor 31 is connected in the current supply path of the oscillator-amplifier 12, and the coils 22 and 23 are connected across it. The meter 14 is connected in series between the negative side of the battery 13 and the resistor 31.

In operation, the oscillator-amplifier 12 comprises both an amplifier and an oscillator. The oscillator converts the direct current from the battery 13 into alternating current. The tuned circuit which is comprised of the coil 25 and the capacitor 26 may be one of the tuned circuits of the oscillator or it may be a tuned circuit of the amplifier, or, in some cases, the oscillator may serve as the amplifier also. In any of these cases, the impedance of the oscillator-amplifier 12 depends, at least in part, upon the tuning of the coil 25 and the capacitor 26. As the beam 24 is moved due to a variation in the force applied to it, the impedance of the coil 25, and the frequency at which it tunes the capacitor 26, changes. When this tuned circuit is part of an oscillator, the detuning of the coil 25-capacitor 26 detunes the oscillator and reduces its impedance, causing it to draw more current. When the coil 25 is part of the input to an amplifier, the coil 25-capacitor 26 circuit is similarly detuned, and the input impedance of the amplifier changes, changing the current flowing therethrough. When the coil 25 is used in the input circuit to an amplifier, it is to be understood that an oscillator is employed to convert the direct current of the battery 13 into alternating current at a frequency substantially that of the tuned circuit, and that this alternating current is the energy passing through the coil 25 and the capacitor 26. Changes in the current flowing through the oscillator-amplifier 12 pass through both the resistor 31 and the meter 14.

As the current passing through the resistor 31 changes, the current passing through the coils 22 and 23 also changes, in a direction to oppose the original force which tended to change the position of the beam 24. As this process continues, a new balance point is reached between the force applied to the beam 24 and the reaction of the magnetic flux due to current flowing through the coils 22 and 23 and the field of the magnet 21. The new balance point is indicated by the current flowing through the meter 14.

Figure 2:
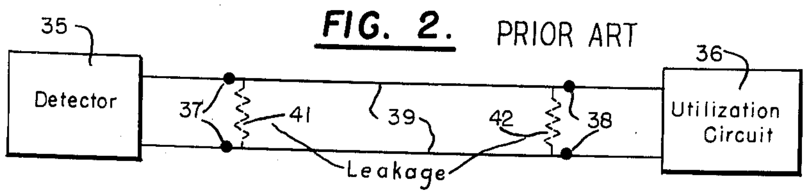
FIG. 2. PRIOR ART
FIG. 2 is a block diagram of a generalized information detection and utilization system.

Instruments such as that shown in FIG. 1 are useful in automated plants, to indicate the pressure being exerted by a rolling mill in a steel plant, for example. In such installations, the measuring or control equipment which responds to the output of the sensing means is usually at some location remote from the mill itself. This may be simply illustrated as shown in FIG. 2. A detector 35 is positioned at the equipment being monitored and transmits its signals to a utilization circuit 36 at some distance removed from the equipment being monitored. The transmission of information between the two is accomplished by means of a two-wire transmission line 39 which is connected to the detector 35 by terminals 37 and to the utilization circuit 36 by terminals 38. A high resistance, in effect, appears across each pair of terminals as shown at 41 and 42.

Figure 3:
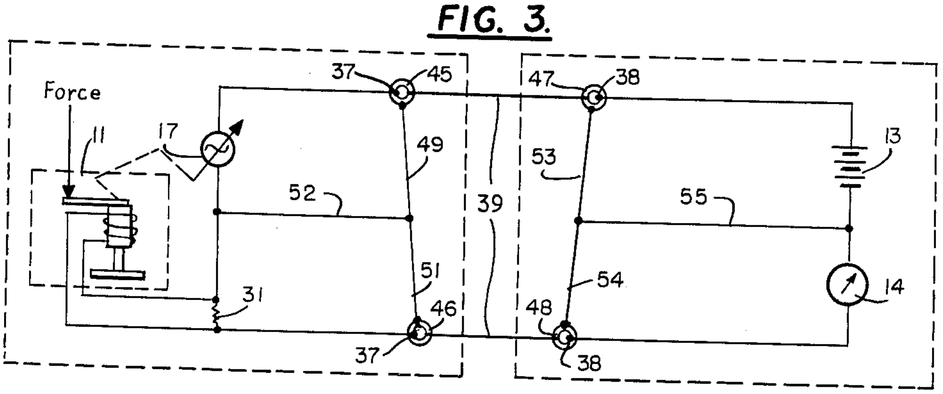
FIG. 3 is a schematic circuit of a generalized information detection and utilization system.

The system of FIG. 2 can be specifically applied to the device of FIG. 1 as shown in FIG. 3 where a simplified diagram of the system is shown. The detector 35 is shown in FIG. 3 comprising the balance 11 of FIG. 1 and an oscillator 17. The coils of the balance 11 are shown as a single coil which is connected across a resistor 31 in series with the oscillator 17 so that the current flowing through the coil of the balance 11 is proportional to the current flowing through the oscillator 17. The utilization circuit 36 is shown comprising the battery 13 and the meter 14. Connecting the detector with the utilization circuit is a pair of wires 39. The detector 35 has terminals 37 and the utilization circuit 36 includes terminals 38 to which the two-wire transmission line is connected.

As indicated in FIG. 2, there normally exists across the terminals 37 and 38 an open circuit with very low conductances which do not affect the operation of the equipment. However, under varying ambient conditions, the conductance across the terminals may change to establish leakage currents sufficient to affect the accuracy and operation of the system. Under conditions of high humidity, or when conductive material inadvertently or purposely approaches the terminals 37 and 38, the conductance between the terminals may change to permit the flow of leakage currents which do affect the operation of the system.

To overcome that possibility without the necessity of shielded or three-wire transmission lines, rings 45, 46, 47 and 48 of conductive material are placed around the terminals 37 and 38. The rings 45 and 46 are connected together by wires 49 and 51 and to the junction of the oscillator 17 and the resistor 31 by a line 52. The rings 47 and 48 around the terminals 38 are connected together by lines 53 and 54 and to the junction of the battery 13 and the meter 14 by a line 55.

Figure 4:
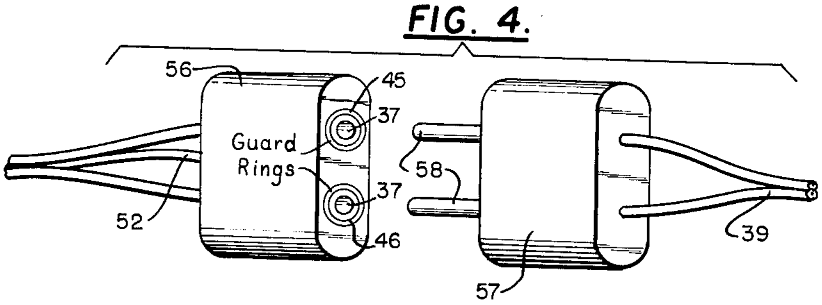
FIG. 4 is a perspective view of a pair of mating connectors suitable for two-wire transmission systems.

A typical arrangement of terminals 37 or 38 is shown in FIG. 4 where the terminals 37 are shown as female connectors mounted in a block of insulating material. Each terminal 37 is surrounded by a ring 45 or 46 of conductive material. The terminals 37 are connected within the block to wires which extend out the other end of the block, and the rings 45 and 46 are connected to a third wire 52. A mating plug which comprises a block of insulating material 57 from which two male connectors 58 extend mates with the terminal block 56 to complete the connections. The wires 39 of the transmission line extend through the block 57 and are connected to the connectors 58. The device of FIG. 4 is only illustrative since the actual construction of the connectors can take any form. In fact, in many installations a simple terminal board on which screw type connectors are mounted will be used. However, the illustrated connector will serve to explain the invention.

It can be seen from FIG. 4, that in atmospheres of high humidity, or when conductive dust particles or the like are permitted to seep between the blocks 56 and 57, a conductive path may be established between the terminals 37. The leakage current through such a path may be detrimental to the operation of the system. However, by surrounding at least one terminal 37 with a conductive ring 45 or 46 and connecting the ring 45 or 46, or both, to the junction of the oscillator 17 and the resistor 31, any low resistance leakage paths which may be established will be between the individual terminal 37 and its associated ring 45 or 46.

Consider first the circuit of FIG. 3 with rings 45 and 47 only. Under adverse conditions, the impedance between terminals 37 or 38 or between any terminal and an adjacent ring 45 or 47 may drop to a value in the order of $10^5$ ohms. Current would then leak from the upper terminal 37 to the ring 45. It is doubtful that current would leak from the lower terminal 37 to the ring 45 since the resistor 31 and the moving coil system of the balance 11 are both usually considerably less than $10^5$ ohms. Any current that leaked from the upper terminal 37 to its ring 45 would also pass through the oscillator 17 and the resistor 31. The current passing through resistor 31 is the current which establishes the balance between the forces and is the current which is measured, so the leakage current would not affect the accuracy of the system. In a similar manner, the current which may leak from the upper terminal 38 to the ring 47 which surrounds it would merely pass back to the battery 13 and not affect the measurement at all. The meter 14 usually has an impedance considerably less than the leakage impedance, and virtually no leakage current would flow from the lower terminal 38. From the above, it becomes evident that in an ungrounded two-wire transmission system such as that described, a guard ring placed around one of a pair of terminals may be sufficient to reduce the effects of leakage.

However, consider the case illustrated, where both terminals of each pair are surrounded by a ring. Since both rings of a pair are connected together, there would be no leakage between them. As pointed out above, the resistances of the resistor 31 and of the coils of both the meter 14 and the balance 11 are considerably less than the leakage resistances between the terminals 37 and 38 and the associated rings 46 and 48, so no leakage currents would flow between the lower terminals and the rings. The upper terminal 37 and its ring 45 are connected across the oscillator 17, and any current leaking therebetween would also pass through the resistor 31 to affect the balance as well as the meter 14 so that it would have no effect on the accuracy of the system, and any current leaking between the upper terminal 38 and its ring 47 would merely pass back to the battery 13 and not affect the remainder of the circuit at all.

Assume, by way of illustration, that the battery 13 provides 30 volts output, which is a standard potential in such sytems, that the normal current flow in the system through the meter 14 is approximately 4 ma., and that the impedance 41 shown in FIG. 2 as the leakage impedance is $10^5$ ohms. The leakage current would then be $30/10^5 = 0.3$ ma. Since the normal current flowing in the system is in the neighborhood of 4 ma., this represents an error of 7.5%. The accuracy of the equipment described is normally held to about 0.5%, so that even if the leakage impedance were as high as $10^6$ ohms, the inaccuracies (0.75%) due to leakage would be greater than the tolerances for the remainder of the system. However, the guard rings provided as shown in FIGS. 3 and 4 effectively prevent the leakage of currents through either the coils of the detector 11 or through the meter 14 to affect one without the other. Since the current flowing through the coils of the detector 11 is the current which establishes the balance point, this current must also flow through the meter 14 for proper operation. The rings 45 and 46 serve to accomplish this.

This specification has described a new and improved means for eliminating the effects of leakage currents across terminals in a measuring control system in which the detector is connected to a remote utilization circuit by a transmission line. The invention uses an inexpensive and effective device for eliminating the effects of leakage without substantially increasing the cost of the installation or its complexity. It is realized that the above specification may indicate to those skilled in the art, other forms which the invention may take without departing from its principles, and it is, therefore, intended that this invention be limited only by the scope of the appended claims.

What is claimed is:

1. An electrical transmission system subject to leakage currents sufficient to disturb the transmission therethrough, said system comprising a first station, a second station, a two-wire transmission path connecting said first station to said second station, said first station comprising an automatic rebalancing unit having a transducer for varying current flow in said path in response to externally applied forces, a rebalancing means connected in series with said transducer and responsive to variations in the series current flow to balance said externally applied force, said current variations approaching leakage currents in magnitude, a first pair of electrical terminals, means for connecting said transducer and rebalancing means between said first pair of terminals, said second station comprising a source of electrical energy, an electrical indicating instrument, means for connecting said source in series with said instrument, a second pair of electrical terminals, means for connecting said source and said instrument between said second pair of terminals, means for connecting said two-wire transmission path to said first and second pairs of terminals, and means for limiting the effects of leakage currents between terminals, said limiting means comprising a conductive member encircling the terminal of said first pair which is connected to said transducer, and means for connecting said conductive member to the junction of said transducer and said rebalancing means so that any leakage currents leaking from said encircled terminal pass to said member and through said rebalancing means.

2. An electrical transmission system subject to leakage currents sufficient to disturb the transmission therethrough, said system comprising a first station, a second station, a two-wire transmission path connecting said first station to said second station, said first station comprising an automatic rebalancing unit having a transducer for varying current flow in said transmission path in response to externally applied forces, a rebalancing means connected in series with said transducer and responsive to variations in the series current flow to rebalance said externally applied forces, said current variations approaching leakage currents in magnitude, a first pair of electrical terminals, means for connecting said series connected transducer and rebalancing means between said first pair of terminals, said second station including a source of electrical energy, an electrical indicating instrument, a second pair of terminals, means for connecting said source and said instrument in series between said second pair of terminals, means for connecting said two-wire transmission path to said first and second pairs of terminals, and means for limiting the effects of leakage currents across said terminals, said limiting means comprising a first conductive member encircling the terminal of said first pair which is connected to said transducer, a second conductive member encircling the terminal of said second pair which is connected to said source, means for connecting said first member to the junction of said transducer and said rebalancing means so that currents leaking from said encircled terminal of said first pair pass through said rebalancing means, and means for connecting said second encircling means to the junction of said source and said instrument so that currents leaking across said second pair pass through said second member and not through said instrument.

3. An electrical transmission system subject to leakage sufficient to disturb the transmission therethrough, said system comprising a first station, a second station, a two-wire transmission path connecting said first station to said second station, said first station comprising an automatic rebalancing unit having a transducer for varying current flow in said path in response to externally applied forces, a rebalancing means connected in series with said transducer and responsive to variations in the series current flow to balance said externally applied forces, said current variations approaching leakage currents in magnitude, a first pair of electrical terminals, means for connecting said transducer and said rebalancing means between said first pair of terminals, said second station including a source of electrical energy, an electrical indicating instrument, a second pair of electrical terminals, means for connecting said source and said instrument in series between said terminals of said second pair, means for connecting said two-wire transmission path to said first and second pairs of terminals, and means for limiting the effects of said leakage currents, said limiting means comprising a conductive member encircling each of said terminals of said first and second pairs, and means for connecting the members encircling the terminals of said first pair to the junction of said transducer and rebalancing means and for connecting the members encircling the terminals of said second pair to the junction of said source and instrument so that leakage currents across said first pair pass through said rebalancing means and said instrument but leakage currents across said second pair do not pass through said instrument.

4. An electrical transmission system subject to leakage currents sufficient to disturb the transmission therethrough, said system comprising a first station, a second station, and a two-wire transmission path connecting said first and second stations, said first station comprising a transducer for varying current flow in said path in response to externally applied forces, a rebalancing means responsive to variations in current flow to balance said externally applied forces, a pair of electrical terminals, and means for connecting said transducer and said rebalancing means in series between said pair of terminals, said second station comprising a source of electrical energy and an electrical indicating instrument connected in series, and means for limiting the effects of currents leaking across said pair of terminals, said limiting means comprising a conductive member encircling the terminals of said first pair, and means for connecting said members together and to the junction of said transducer and said rebalancing means so that currents leaking between said terminals pass to the junction of the transducer and the rebalancing means and pass through the rebalancing means.

5. An electrical transmission system subject to leakage currents sufficient to disturb the transmission therethrough, said system comprising a first station, a second station, and a two-wire transmission path connecting said first and second stations, said first station comprising a transducer for varying current flow in said path in response to externally applied forces, a rebalancing means responsive to variations in current flow to balance said externally applied forces, and means for connecting said transducer and said rebalancing means in series, said second station comprising a source of electrical energy, an electrical indicating instrument, a pair of electrical terminals, and means for connecting said source and said instrument in series across said terminals, and means for limiting the effects of leakage currents across said terminals, said limiting means comprising a conductive member encircling each of said terminals, and means connecting said conductive members to the junction of said source and said instrument so that any currents leaking across said terminals by-pass said instrument.

6. A detection and control system which includes a transducer for sensing a variable condition and generating electrical current signals representative of that condition, means responsive to the signals generated by said transducer and indicating the value of those signals, and means interconnecting said transducer and said indicating means, said transducer comprising a variable impedance, and a rebalancing means responsive to the signals generated by the transducer to balance said variable condition, said transducer being electrically connected in series with said rebalancing means so that the current variations due to changes in the impedance of the transducer modify the effect of the rebalancing means to establish a different balance point for each change in said variable condition, first and second output terminals, means for connecting said first output terminal to the free end of said transducer, means for connecting said second output terminal to the free end of said rebalancing means, a first conductive member encircling said first output terminal, means for connecting said first conductive member to the junction between said transducer and said rebalancing means, a second conductive member encircling said second output terminal, means for connecting said second conductive member to said first conductive member to conduct current leaking between said output terminals through said rebalancing means, said signal responsive means including a source of electrical energy and an electrical indicating means, means for connecting said source and said indicating means in series, a first input terminal connected to the free end of said source, a second input terminal connected to the free end of said indicating means, a third conductive member encircling said first input terminal, means connecting said third member to the junction between said source and said indicating means, and a fourth conductive member encircling said second input terminal and connected to said third member to conduct leakage current between said input terminals around said indicating means.

References Cited by the Examiner

UNITED STATES PATENTS

| | | | |
|---|---|---|---|
| 2,222,953 | 11/1940 | Nomann | 179—78 |
| 2,282,319 | 5/1942 | Brown | 340—200 |
| 3,117,310 | 1/1964 | Roper | 340—187 |

NEIL C. READ, *Primary Examiner.*

THOMAS B. HABECKER, *Examiner.*